(12) United States Patent
Burke

(10) Patent No.: US 11,156,977 B2
(45) Date of Patent: *Oct. 26, 2021

(54) SYSTEMS AND METHODS FOR TIME USE OPTIMIZATION

(71) Applicant: Virtual Peaker, Inc., Louisville, KY (US)

(72) Inventor: William J. Burke, Louisville, KY (US)

(73) Assignee: Virtual Peaker, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,646

(22) Filed: Mar. 17, 2020

(65) Prior Publication Data

US 2020/0218218 A1 Jul. 9, 2020

Related U.S. Application Data

(63) Continuation of application No. 15/819,295, filed on Nov. 21, 2017, now Pat. No. 10,642,239.
(Continued)

(51) Int. Cl.
*G05B 19/042* (2006.01)
*G05B 13/02* (2006.01)
(Continued)

(52) U.S. Cl.
CPC ....... *G05B 19/0426* (2013.01); *G05B 13/021* (2013.01); *G05B 15/02* (2013.01);
(Continued)

(58) Field of Classification Search
CPC .. G05B 19/0426; G05B 19/042; G05B 15/02; G05B 19/048; G05B 13/021;
(Continued)

(56) References Cited

U.S. PATENT DOCUMENTS

| 4,922,412 A | 5/1990 | Lane et al. |
| 5,544,036 A | 8/1996 | Brown, Jr. et al. |

(Continued)

OTHER PUBLICATIONS

Non-Final Office Action dated Feb. 20, 2019 in copending U.S. Appl. No. 15/819,295.
Non-Final Office Action dated Aug. 13, 2019 in copending U.S. Appl. No. 15/819,295.

*Primary Examiner* — Thomas C Lee
*Assistant Examiner* — Charles Cai
(74) *Attorney, Agent, or Firm* — Dinsmore & Shohl LLP

(57) ABSTRACT

Systems and methods for time use optimization are provided. One embodiment of a method includes determining time of use pricing data associated with purchase of energy from an energy provider, partitioning a predetermined amount of time into a plurality of segments, where the plurality of segments corresponds with the higher cost tier and the lower cost tier, and creating an energy set point schedule for setting a set point of a controllable device, where the energy set point schedule sets the set point of the controllable device to a predetermined value for each of the plurality of segments. Some embodiments include determining energy utilized by the controllable device during at least a portion of the energy set point schedule and iteratively altering the energy set point schedule, based on a comparison of the energy utilized and a current status of the energy set point schedule.

20 Claims, 5 Drawing Sheets

Related U.S. Application Data

(60) Provisional application No. 62/427,554, filed on Nov. 29, 2016.

(51) Int. Cl.
  *G06Q 50/06* (2012.01)
  *G05B 15/02* (2006.01)
  *G05B 19/048* (2006.01)

(52) U.S. Cl.
  CPC ......... *G05B 19/042* (2013.01); *G05B 19/048* (2013.01); *G06Q 50/06* (2013.01); *G05B 2219/2614* (2013.01); *G05B 2219/2639* (2013.01); *G05B 2219/2642* (2013.01)

(58) Field of Classification Search
  CPC .... G05B 2219/2639; G05B 2219/2614; G05B 2219/2642; G06Q 50/06
  See application file for complete search history.

(56) References Cited

U.S. PATENT DOCUMENTS

| | | |
|---|---|---|
| 5,646,049 A | 7/1997 | Tayi |
| 5,761,083 A | 6/1998 | Brown, Jr. et al. |
| 8,108,076 B2 | 1/2012 | Imes et al. |
| 8,145,361 B2 | 3/2012 | Forbes, Jr. et al. |
| 8,473,111 B1 | 6/2013 | Shankar et al. |
| 9,916,630 B2 | 3/2018 | Saito et al. |
| 2004/0024483 A1 | 2/2004 | Holcombe |
| 2010/0123436 A1 | 5/2010 | Herrod et al. |
| 2011/0025258 A1 | 2/2011 | Kim et al. |
| 2011/0270452 A1* | 11/2011 | Lu .................... G06Q 10/06 700/291 |
| 2013/0085614 A1* | 4/2013 | Wenzel .............. G05B 13/021 700/277 |
| 2013/0144451 A1 | 6/2013 | Kumar et al. |
| 2013/0151012 A1 | 6/2013 | Shetty et al. |
| 2018/0138742 A1 | 5/2018 | Song et al. |

* cited by examiner

| | |
|---|---|
| WEEKENDS 12:00 AM – 5:00 AM | $0.0887/KWh |
| WEEKENDS 5:01 AM – 12:00 PM | $0.0911/KWh |
| WEEKENDS 12:01 PM – 9:00 PM | $0.0924/KWh |
| WEEKENDS 9:01 PM – 11:59 PM | $0.887/KWh |
| WEEKDAYS 12:00 AM – 5:00 AM | $0.0887/KWh |
| WEEKDAYS 5:01 AM – 5:00 PM | $0.0911/KWh |
| WEEKDAYS 5:01 PM – 11:59 PM | $0.0924/KWh |

FIG. 2

| | |
|---|---|
| WEEKDAYS 5:04 AM | 116°F |
| WEEKDAYS 7:38 AM | 122°F |
| WEEKENDS 8:17 AM | 138°F |
| WEEKENDS 11:41 PM | 102°F |
| SUNDAYS 12:19 PM | 131°F |

FIG. 3

SYSTEMS AND METHODS FOR TIME USE OPTIMIZATION

CROSS REFERENCE

This application is a continuation of U.S. patent Ser. No. 15/819,295 filed Nov. 21, 2017, which claims the benefit of U.S. Provisional Ser. No. 62/427,554, filed Nov. 29, 2016, all of which are incorporated herein by reference in its entirety.

TECHNICAL FIELD

Embodiments described herein generally relate to systems and methods for time use optimization and, more specifically, to systems and methods for optimizing use of a water heater or other controllable device.

BACKGROUND

Household devices, commercial devices, and other controllable devices may store energy, such as thermal energy, electrical energy, potential energy, etc. As an example, water heaters and heating ventilation, air conditioning (HVAC) systems may store thermal energy. Batteries and capacitors may store electrical energy. Additionally, many energy companies now offer price structures such that incentivize an energy user to consume energy at predetermined periods during a day. As such, those devices that operate consistently throughout the day may not operate as financially efficiently as possible.

As an example, a water heater typically stores energy in the form of hot water for usage at a later time. Because water heaters are often well insulated, it often does not matter when the water is heated, so long as there is sufficient hot water when the user needs to use the water. As a result, oftentimes the water in a water heater could be heated at any time of day.

SUMMARY

Systems and methods for time use optimization are provided. One embodiment of a method includes determining time of use pricing data associated with purchase of energy from an energy provider, partitioning a predetermined amount of time into a plurality of segments, where the plurality of segments corresponds with the higher cost tier and the lower cost tier, and creating an energy set point schedule for setting a set point of a controllable device, where the energy set point schedule sets the set point of the controllable device to a predetermined value for each of the plurality of segments. Some embodiments include determining energy utilized by the controllable device during at least a portion of the energy set point schedule and iteratively altering the energy set point schedule, based on a comparison of the actual energy usage and a current status of the energy set point schedule.

Embodiments of a system include a controllable device that includes an energy storage component for storing energy and an energy distribution component for distributing the energy to an environment, where the energy is purchased from an energy provider. The system may also include a computing device that includes a processor and a memory component. The memory component may store logic that, when executed by the processor, causes the system to receive time of use pricing data associated with purchase of the energy from the energy provider, where the time of use pricing data includes a higher cost tier associated with a higher cost for the energy during a first predetermined time period and a lower cost tier associated with a lower cost for the energy during a second predetermined time period. The logic may further cause the system to determine a desired energy output for the controllable device and create an energy set point schedule that controls a setting of the controllable device, such that the energy set point schedule causes the computing device to adjust the setting of the controllable device at predetermined segments to maintain a desired energy set point for the controllable device, while factoring the time of use pricing data. The logic may further cause the system to collect data regarding an actual demand for the energy, where the data regarding the actual demand includes an amount of energy actually used, a time of actual use, and a cost of the energy actually used, based on the time of use pricing data and iteratively alter the energy set point schedule based on the data regarding the actual demand for the energy.

Embodiments of a non-transitory computer-readable medium are also provided. Some embodiments include logic that, when executed by a computing device causes the computing device to determine time of use pricing data associated with purchase of energy from an energy provider, where the time of use pricing data includes a higher cost tier associated with a higher cost for the energy during a first predetermined time period and a lower cost tier associated with a lower cost for the energy during a second predetermined time period. The logic may further cause the computing device to partition a predetermined amount of time into a plurality of segments, where the plurality of segments corresponds with the higher cost tier and the lower cost tier and create an energy set point schedule for setting a set point of a controllable device, where the energy set point schedule sets the set point of the controllable device to a predetermined value for each of the plurality of segments. In some embodiments, the logic causes the computing device to, after conclusion of the first predetermined time period, compute energy utilized by the controllable device during a segment associated with the higher cost tier and, in response to a determination that energy used during the first predetermined time period is greater than about zero, adjust an energy set point of a segment that precedes the higher cost tier to a higher value.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2 depicts a time of use schedule that may be implemented by a utility, according to embodiments described herein;

FIG. 3 depicts a user heating schedule, according to embodiments described herein;

DETAILED DESCRIPTION

Embodiments disclosed herein include systems and methods for time of use optimization. As an example, water heaters typically include a large tank of water, a heater element, and a control system for regulating the temperature of water in the tank. Some water heaters use electric resistance elements and some also use a heat pump to heat the water. The temperature in the tank decreases in response to two stimuli: conductive losses between the hot water and the outside air and the mixing of incoming cooler water after removal of hot water by the user. The control system attempts to keep the temperature in the tank close to a target (or set point) temperature. Embodiments of other controllable devices are also described herein.

A time of use (TOU) electricity rate is a pricing structure for electricity that changes based on the time of day and day of the week. Typically, the price of energy ($/kilowatt-hour) would be less expensive at night and more expensive during the work-day.

The typical user keeps a fairly predictable schedule, and this predictability can be leveraged to reduce the cost of heating water with time of use rates. Embodiments described herein include an iterative learning algorithm for adjusting the water temperature set point. The learning algorithm may be configured to learn a 7-day set point schedule (or other schedule) to minimize the cost of heating water.

Accordingly, some embodiments may be configured to propose at least one goal and/or objective of the water heater performance (e.g. keep temperature above 100 degrees Fahrenheit and minimize cost). Additionally, embodiments may be configured to partition the day into segments and group segments (periods) by the utility cost. At the start of a high-price period, the set point may be set to a lower threshold temperature. At the end of the high-price period, the electrical energy used during the period may be computed. If energy used is greater 0, the set point temperature of the segment preceding the high-priced period may be adjusted to a higher value. If energy used equals 0, the segment preceding the high-priced period may be adjusted to a lower temperature. In some embodiments, this may be iteratively adjusted until cost and comfort are optimized. The systems and methods for time use optimization incorporating the same will be described in more detail, below.

Additionally, other embodiments of controllable devices may utilize similar processes to utilize time of use incentives advantageously. As an example, an electric battery may be configured to pull electrical energy from a utility, based on a balance of cost and anticipated demand. Determinations may also be made regarding wither the capacity of the controllable device is sufficient to fully optimize the time of use price structure and energy demand. If not, embodiments may provide a recommendations for upgrade.

Figure 1:
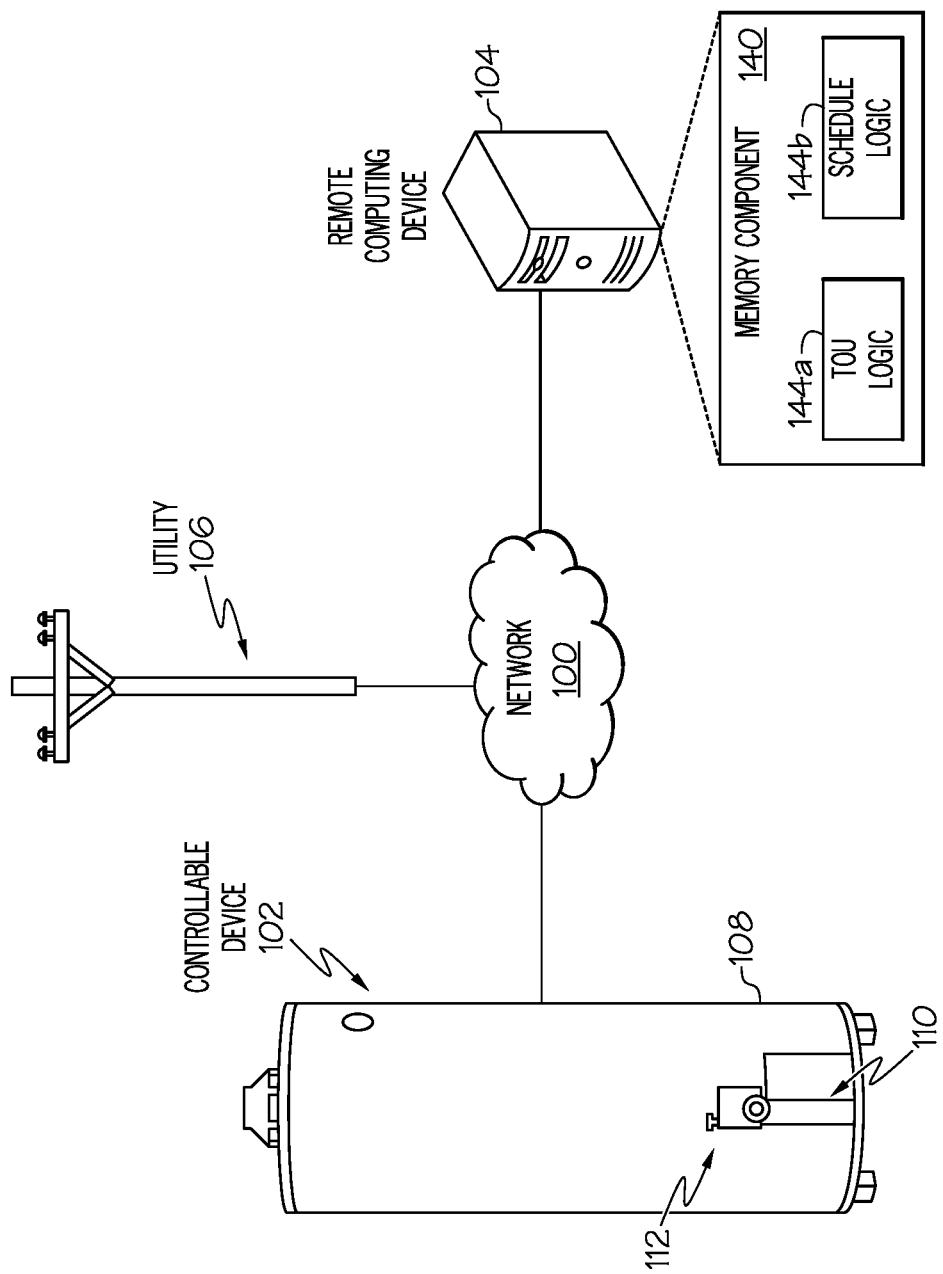
FIG. 1 depicts a computing environment for time of use optimization, according to embodiments described herein.

Referring now to the drawings, FIG. 1 depicts a computing environment for time of use optimization, according to embodiments described herein. As illustrated, a network 100 may facilitate communication between of energy from a utility 106 and/or data among a controllable device 102, a remote computing device 104, and a utility 106. As such, the network 100 may include an electricity network to provide electrical power to homes and businesses, a gas line network to provide natural gas to homes and businesses, a wide area network, such as the internet, a local network, etc. Additionally, the controllable device 102 is depicted as a tank water heater, but may include any device that is subject to time of use scheduling and is controllable according to a predetermined schedule, such as a battery, a home ventilation air condition (HVAC) system, and/or other device.

As illustrated, the controllable device 102 may include a tank 108 (or cell, depending on the embodiment), a local computing device 110, and a heating element 112. The tank 108 may be configured for receiving water for heating. The heating element 112 may be configured for electrical and/or gas heating, depending on the embodiment, and may include a thermometer and/or thermostat to measure and regulate the temperature of the water. The local computing device 110 may be configured to receive and/or determine a schedule for time of use, user schedule and/or heating, and communicate with the thermostat to regulate the temperature, as described herein.

The remote computing device 104 may be coupled to the utility 106 and/or the controllable device 102 and may include a memory component 140 that stores time of use logic 144*a* and schedule logic 144*b*. The time of use logic 144*a* may be configured to cause the remote computing device 104 to receive and/or determine a time of use schedule that is implemented by the utility 106. The time of use logic 144*a* may additionally cause the remote computing device 104 to determine a user schedule associated with the controllable device 102. The schedule logic 144*b* may cause the remote computing device 104 to determine a schedule for activating the heating element 112 to maximize efficiency and reduce cost, while still maintaining a user-defined level of service by the controllable device 102.

It should be understood that while the remote computing device 104, the time of use logic 144*a*, and the schedule logic 144*b* are depicted as being remote from the controllable device 102, this is merely an example. Some embodiments are configured such that at least a portion of this functionality is provided by the local computing device 110.

FIG. 2 depicts a time of use schedule that may be implemented by a utility 106, according to embodiments described herein. As illustrated, a time of use schedule may be communicated to the remote computing device 104 by the utility 106.

FIG. 3 depicts a user heating schedule, according to embodiments described herein. Depending on the particular embodiment, the remote computing device 104 and/or the local computing device 110 may monitor usage of the controllable device 102 to determine the schedule in FIG. 3. In some embodiments, the remote computing device 104 may provide a user interface for the user to specifically input a desired schedule and/or edit an existing schedule. Regardless, based on the information in the user heating schedule and the time of use schedule of FIG. 2, a calculation may be performed to determine when the heating element 112 should be active to heat the water, such that the controllable device 102 can provide water at a predetermined temperature at the determined user heating schedule. As such, some embodiments of the remote computing device 104 may provide the user with a user interface to specify a desired temperature during times of usage. Depending on the embodiment, this option may be provided on the controllable device 102. The remote computing device 104 may also monitor the water temperature to determine a rate of temperature drop in the controllable device 102.

As an example, if the user specifies that the desired water temperature from the controllable device 102 should be 100 degrees Fahrenheit, the remote computing device 104 may determine how long the heating element 112 should heat the water to achieve the set point temperature during the times of high usage. Additionally, the remote computing device 104 may also consider the time of usage schedule to select the most cost effective heating schedule to achieve both the set point and the cost efficiency.

Figure 4:
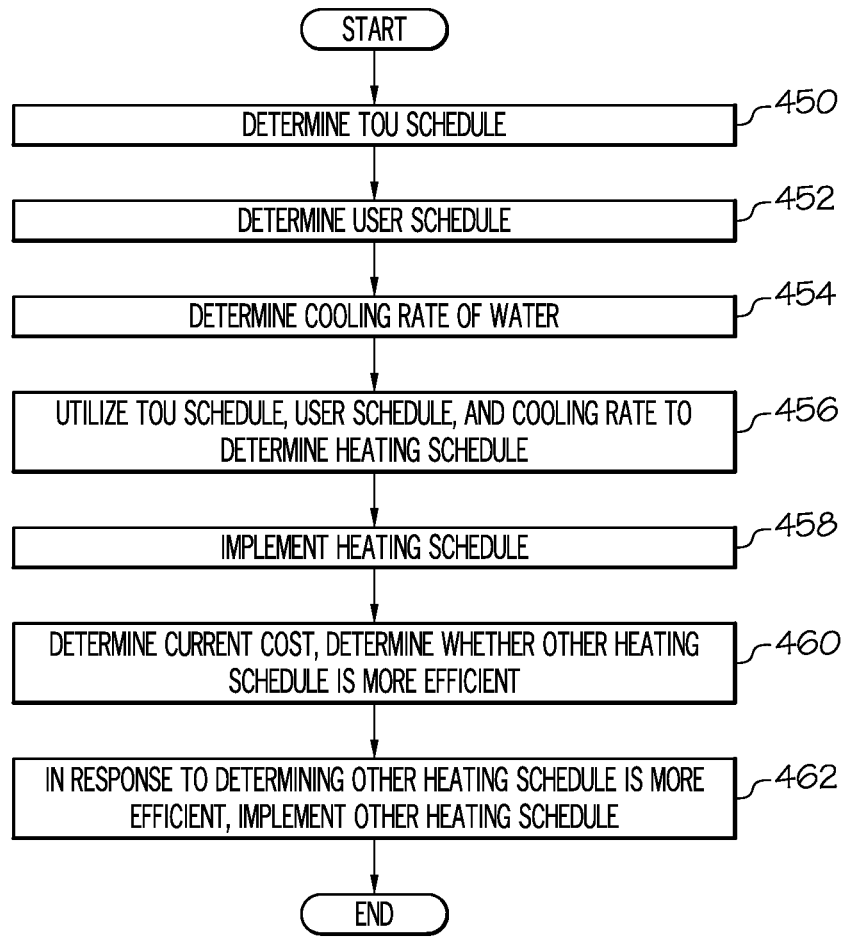
FIG. 4 depicts a flowchart for time of use optimization, according to embodiments described herein.

FIG. 4 depicts a flowchart for time of use optimization, according to embodiments described herein. As illustrated in block 450, a time of use schedule may be determined. In block 452, a user heating schedule may be determined. In block 454, a cooling rate of the water may be determined. In block 456, the time of use schedule, the user heating schedule, and the cooling rate may be utilized to determine a heating schedule that meets a predetermined set point, as well as meets the desired cost efficiency. In block 458, the heating schedule may be implemented. In block 460, the current cost may be determined, as well as whether another heating schedule can achieve the same level of service, with a lower cost. In block 462, in response to determining that the other heating schedule is more efficient, the other heating schedule may be implemented.

Figure 5:
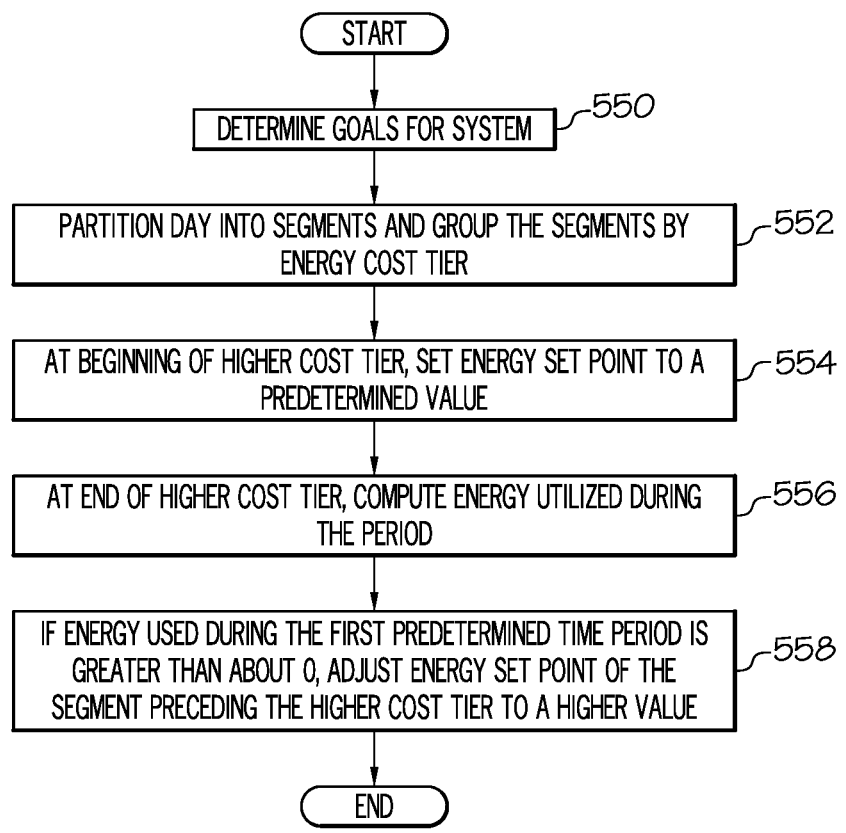
FIG. 5 depicts another flowchart for time of use optimization, according to embodiments described herein.

FIG. 5 depicts another flowchart for time of use optimization, according to embodiments described herein. As illustrated in block 550, goals for the system may be determined. Depending on the embodiment, the goal is utilized to determine a characteristic of the energy set point schedule. In block 552, a day may be partitioned into segments and the segments may be grouped by energy cost tier. In block 554, at the beginning of a higher cost tier, the energy set point may be set to a first predetermined value. In block 556, at the end of the higher cost tier, energy utilized during the period may be computed. As will be understood, reference to energy being utilized may include external energy added to the system, energy removed from the system from basic losses, energy removed from the system by usage, e.g. people using hot water, a difference in energy from the desired setting and the current setting at the end of the time period. In a water heater example, this could be the difference in temperature from the set point and the current temperature. This may represent excess or deficient system energy.

In block 558, if the energy used during the first predetermined time period is greater than about 0, the energy set point of the segment preceding the higher cost tier may be adjusted to a higher value. Additionally, in response to a determination that energy used during the first predetermined time period is greater than about zero, the energy set point schedule may be altered at the first predetermined time period to a lower value. In response to a determination that energy used during the first predetermined time period is less than about zero, the energy set point of a segment that precedes the higher cost tier may be adjusted to a lower value.

Depending on the particular embodiment, the energy set point schedule may be altered based on the following: $T_i(k+1)=T_i(k)-\rho\gamma E_i(k)$; $T_{i-1}(k+1)=T_{i-1}(k)+\epsilon\gamma E_i(k)$ when $P_{i-1}<P_i$; $T_i(k+1)=T_i(k)$; $T_{i-1}(k+1)=T_{i-1}(k)$ when $P_{i-1}>=P_i$; where k is a current iteration, $T_i$ is a scheduled state variable at a time segment i, $E_i$ is a change in energy over the time segment i, $\rho>0$ and $\epsilon>0$ are learning constants, and $\gamma$ is a conversion from energy to state variable. Other formulations for determining the energy set point schedule may also be utilized.

Figure 6:
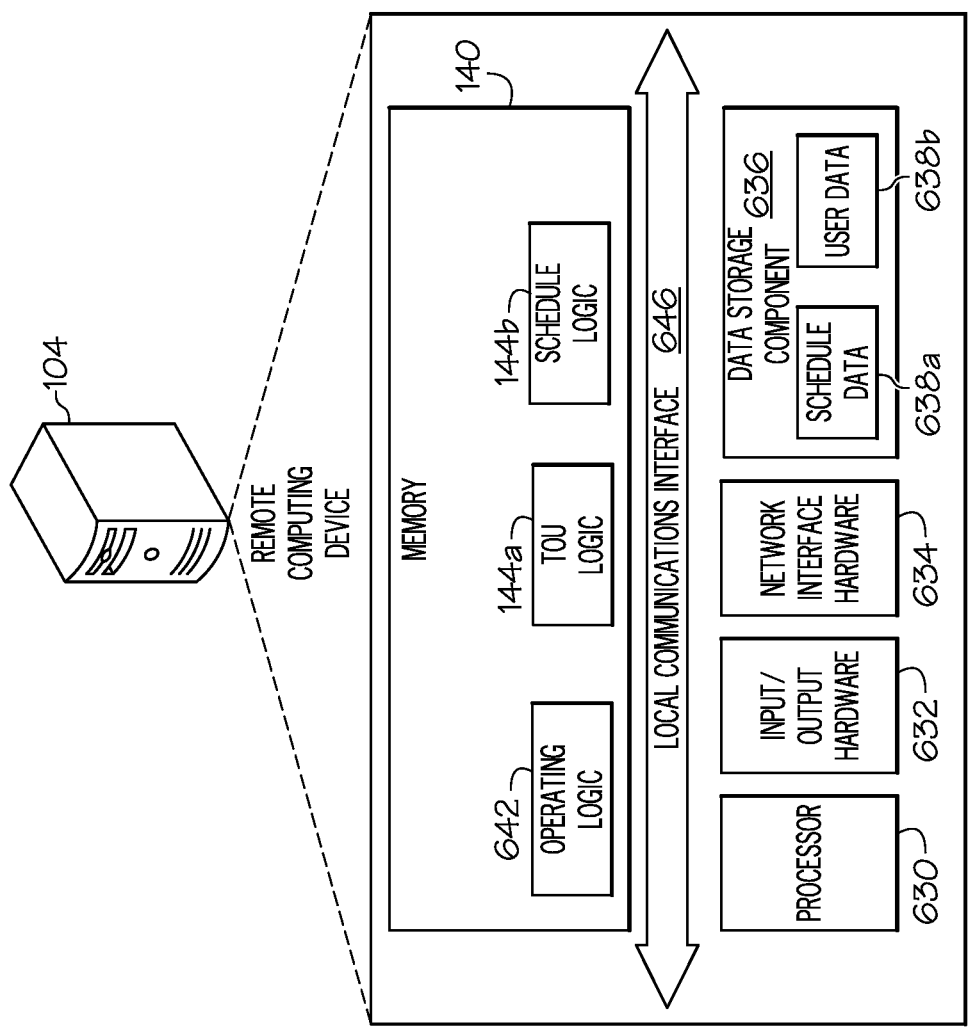
FIG. 6 depicts a remote computing device for time use optimization, according to embodiments described herein.

FIG. 6 depicts a remote computing device 104 for time use optimization, according to embodiments described herein. As illustrated, the remote computing device 104 includes a processor 630, input/output hardware 632, the network interface hardware 634, a data storage component 636 (which stores schedule data 638a, user data 638b, and/or other data), and the memory component 140. The memory component 140 may be configured as volatile and/or non-volatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating logic 642, the time of use logic 144a, and the schedule logic 144b. The time of use logic 144a and the schedule logic 144b may each include a plurality of different pieces of logic, each of which may be embodied as a computer program, firmware, and/or hardware, as an example. A local interface 646 is also included in FIG. 6 and may be implemented as a bus or other communication interface to facilitate communication among the components of the remote computing device 104.

The processor 630 may include any processing component operable to receive and execute instructions (such as from a data storage component 636 and/or the memory component 140). The input/output hardware 632 may include and/or be configured to interface with microphones, speakers, a display, and/or other hardware.

The network interface hardware 634 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the remote computing device 104 and other computing devices, such as the controllable device 102.

The operating logic 642 may include an operating system and/or other software for managing components of the remote computing device 104. As also discussed above, time of use logic 144a and the schedule logic 144b may reside in the memory component 140 and may be configured to perform the functionality, as described herein.

It should be understood that while the components in FIG. 6 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the time of use logic 144a and the schedule logic 144b may reside on different computing devices. As an example, one or more of the functionalities and/or components described herein may be provided by a remote computing device 104 and/or local computing device 110, which may be coupled to the remote computing device 104 via the network 100.

Additionally, while the remote computing device 104 is illustrated with the time of use logic 144a and the schedule logic 144b as separate logical components, this is also an example. In some embodiments, a single piece of logic (and/or or several linked modules) may cause the remote computing device 104 to provide the described functionality.

As illustrated above, various embodiments time of use optimization are disclosed. These embodiments may cause the user to experience consistent performance of a controllable device at a lower cost, based on time of use scheduling.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for time of use optimization. It should also be understood that these embodiments are merely exemplary and are not intended to limit the scope of this disclosure.

What is claimed is:

1. A method for time of use optimization comprising:
   determining time of use pricing data associated with purchase of energy from an energy provider, wherein the time of use pricing data includes a higher cost tier associated with a higher cost for the energy during a first time period and a lower cost tier associated with a lower cost for the energy during a second time period;
   partitioning a predetermined amount of time into a first plurality of segments and a second plurality of segments, wherein at least one of the first plurality of segments corresponds with the higher cost tier and at least one of the second plurality of segments corresponds with the lower cost tier;
   creating an energy set point schedule for setting a current set point of a controllable device, while maintaining operation and control of the controllable device through all of the energy set point schedule, wherein the energy set point schedule is altered according to $T_i(k+1)=T_i(k)-\rho\gamma E_i(k)$; $T_{i-1}(k+1)=T_{i-1}(k)+\epsilon\gamma E_i(k)$ when $P_{i-1}<P_i$, wherein k is a current iteration, $T_i$ is a scheduled state variable at a time segment i, $E_i$ is a change in energy over a time segment i, $\rho>0$ and $\epsilon>0$ are learning constants, $P_i$ is the price of energy at time segment i, and $\gamma$ is a conversion from energy to state variable;
   determining whether energy purchased by the controllable device during the higher cost tier is greater than about zero; and
   in response to determining that the energy purchased by the controllable device during the higher cost tier is greater than about zero, iteratively altering an energy set point temperature of a segment that precedes the higher cost tier to a higher value.

2. The method of claim 1, wherein the controllable device includes at least one of the following: a water heater, a home ventilation and air condition (HVAC) system, or a battery.

3. The method of claim 1, wherein the energy set point schedule is further altered based on the following:

$$T_i(k+1)=T_i(k); T_{i-1}(k+1)=T_{i-1}(k) \text{ when } P_{i-1}>=P_i.$$

4. The method of claim 1, further comprising altering the energy set point schedule to maintain a desired energy output while minimizing cost incurred for the energy.

5. The method of claim 1, wherein the energy set point schedule includes segments for each day of a week.

6. The method of claim 1, further comprising receiving a goal for the energy set point schedule, wherein the goal is utilized to determine a characteristic of the energy set point schedule.

7. A system for time of use optimization comprising:
   a controllable device that includes an energy storage component for storing energy and an energy distribution component for distributing the energy to an environment, wherein the energy is purchased from an energy provider; and
   a computing device that includes a processor and a memory component, wherein the memory component stores logic that, when executed by the processor, causes the system to perform at least the following:
      receive time of use pricing data associated with purchase of the energy from the energy provider, wherein the time of use pricing data includes a higher cost tier associated with a higher cost for the energy during a first time period and a lower cost tier associated with a lower cost for the energy during a second time period;
      determine a desired energy output for the controllable device;
      create an energy set point schedule that controls a current set point setting of the controllable device, such that the energy set point schedule causes the computing device to adjust the current set point setting of the controllable device at predetermined segments while maintaining operation and control of the controllable device through all of the energy set point schedule, and while factoring the time of use pricing data, wherein the energy set point schedule is set according to $T_i(k+1)=T_i(k)-\rho\gamma E_i(k)$; $T_{i-1}(k+1)=T_{i-1}(k)+\epsilon\gamma E_i(k)$ when $P_{i-1}<P_i$; wherein k is a current iteration, $T_i$ is a scheduled state variable at a time segment i, $E_i$ is a change in energy over a time segment i, $\rho>0$ and $\epsilon>0$ are learning constants, $P_i$ is the price of energy at time segment i, and $\gamma$ is a conversion from energy to state variable;
      collect data regarding an actual demand for the energy, wherein the data regarding the actual demand includes an amount of energy actually used, a time of actual use, and a cost of the energy actually purchased, based on the time of use pricing data; and
      in response to a determination that energy purchased during the first time period is greater than about zero, iteratively alter a temperature of the energy set point schedule based on the data regarding the actual demand for the energy.

8. The system of claim 7, wherein the controllable device includes at least one of the following: a water heater, a home ventilation and air condition (HVAC) system, or a battery.

9. The system of claim 7, wherein the energy set point schedule is further set based on the following:

$$T_i(k+1)=T_i(k); T_{i-1}(k+1)=T_{i-1}(k) \text{ when } P_{i-1}>=P_i.$$

10. The system of claim 7, wherein the logic further causes the system to alter the energy set point schedule to maintain the desired energy output while minimizing cost incurred for the energy.

11. The system of claim 7, wherein in response to a determination that energy purchased during the first time period is greater than about zero, the logic causes the system to alter the energy set point schedule at the first time period to a lower value.

12. The system of claim 7, wherein in response to a determination that energy purchased during the first time period is greater than about zero, the logic causes the system to adjust an energy set point of a segment that precedes the higher cost tier to a higher value.

13. The system of claim 7, wherein in response to a determination that energy purchased during the first time period is less than about zero, adjust an energy set point of a segment that precedes the higher cost tier to a lower value.

14. A non-transitory computer-readable medium that stores logic that, when executed by a computing device causes the computing device to:
determine time of use pricing data associated with purchase of energy from an energy provider, wherein the time of use pricing data includes a higher cost tier associated with a higher cost for the energy during a first time period and a lower cost tier associated with a lower cost for the energy during a second time period;
partition a predetermined amount of time into a plurality of segments, wherein the plurality of segments corresponds with the higher cost tier and the lower cost tier;
create an energy set point schedule for setting a current set point of a controllable device, while maintaining operation and control of the controllable device through all of the energy set point schedule, wherein the energy set point schedule is created based on $T_i(k+1)=T_i(k)-\rho\gamma E_i(k)$; $T_{i-1}(k+1)=T_{i-1}(k)+\varepsilon\gamma E_i(k)$ when $P_{i-1}<P_i$, wherein k is a current iteration, $T_i$ is a scheduled state variable at a time segment i, $E_i$ is a change in energy over a time segment i, $\rho>0$ and $\varepsilon>0$ are learning constants, $P_i$ is the price of energy at time segment i, and $\gamma$ is a conversion from energy to state variable;
compute energy purchased by the controllable device during a segment associated with the higher cost tier; and
in response to a determination that energy purchased during the first time period is greater than about zero, adjust an energy set point of a segment that precedes the higher cost tier to a higher value.

15. The non-transitory computer-readable medium of claim 14, wherein the controllable device includes at least one of the following: a water heater, a home ventilation and air condition (HVAC) system, or a battery.

16. The non-transitory computer-readable medium of claim 14, wherein the energy set point schedule is further created based on the following:

$$T_i(k+1)=T_i(k); T_{i-1}(k+1)=T_{i-1}(k) \text{ when } P_{i-1}>=P_i.$$

17. The non-transitory computer-readable medium of claim 14, wherein the logic causes the computing device to alter the energy set point schedule to maintain a desired energy output while minimizing cost incurred for the energy.

18. The non-transitory computer-readable medium of claim 14, wherein the energy set point schedule includes segments for each day of a week.

19. The non-transitory computer-readable medium of claim 14, wherein the logic further causes the computing device to group the plurality of segments according to the higher cost tier and the lower cost tier.

20. The non-transitory computer-readable medium of claim 14, wherein the energy set point schedule is iteratively adjusted, based on an actual energy usage.

* * * * *